United States Patent [19]

Paratte

[11] 3,736,741
[45] June 5, 1973

[54] DEVICE FOR SECURING AN ELECTRICAL CELL IN A TIMEPIECE MOVEMENT

[75] Inventor: Daniel Paratte, Neuchatel, Switzerland

[73] Assignees: Montres Rolex S.A. Dussaud, Geneve; Manufacture Des Montres Rolex S.A., Bienne, Switzerland

[22] Filed: Nov. 4, 1971

[21] Appl. No.: 195,566

[30] Foreign Application Priority Data

Nov. 27, 1970 Switzerland..................17617/70

[52] U.S. Cl. ...................58/23 BA, 58/55, 58/88
[51] Int. Cl. ....................G04c 3/00, G04b 37/00
[58] Field of Search ............58/23 R, 23 BA, 53–56, 58/88

[56] References Cited

UNITED STATES PATENTS

| 3,597,913 | 8/1970 | Fujimori | 58/23 BA |
| 3,608,304 | 9/1971 | Shaad | 58/23 BA |

*Primary Examiner*—Richard B. Wilkinson
*Assistant Examiner*—Edith C. Simmons Jackmon
*Attorney*—Richard K. Stevens, Davidson C. Miller, Ellsworth H. Masher et al.

[57] ABSTRACT

An electrical cell is secured in a trough shaped housing in a plate of a timepiece movement by a device located at the periphery of the housing. Said device comprises at least one member such as a washer with a cut-away edge held by means of a screw which moves it, from a rest position in which the cell is free, downwardly and inwardly into the housing to an operative position biting into the wall of the cell which is firmly held against a contact in the housing.

4 Claims, 3 Drawing Figures

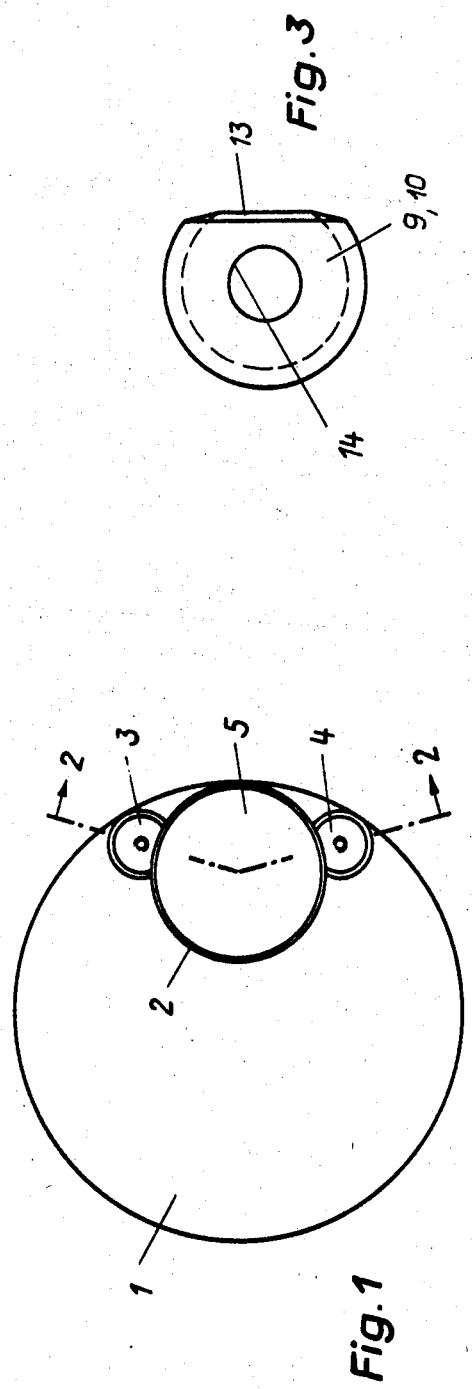
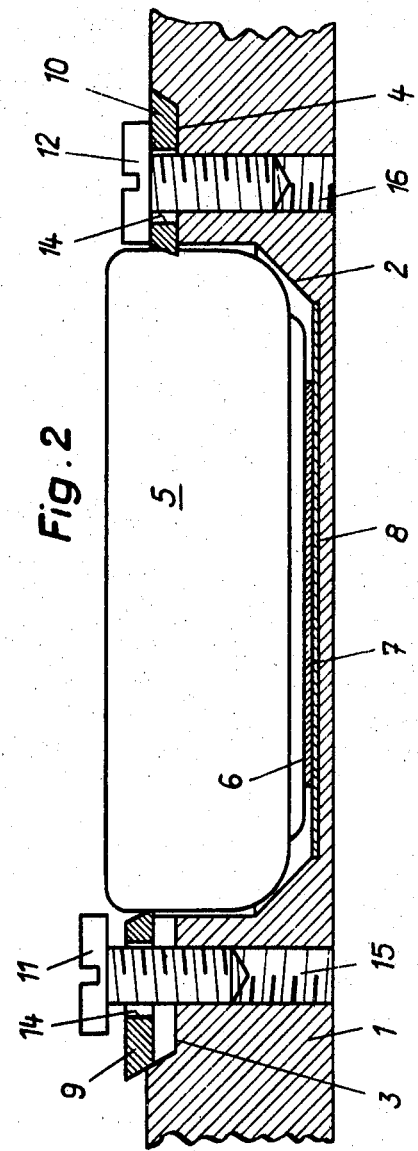

3,736,741

DEVICE FOR SECURING AN ELECTRICAL CELL IN A TIMEPIECE MOVEMENT

BACKGROUND OF THE INVENTION

The present invention relates to devices for securing electrical cells onto timepiece movements. For the sake of convenience, the term "cell" is used in this context and throughout the specification to cover the various types of chemically operating electrical generators such as dry cells, accumulators, batteries and so on.

Certain known electrical or electronic timepiece movements comprise a trough-shaped housing for a cell which is secured in the housing by means fo a securing plate covering the cell. This plate sets up a contact with one of the terminals of the cell and is insulated from the main frame of the movement to avoid short-circuiting, the frame making contact with another terminal of the cell. This plate is in resilient elastic material so that it can hold the cell in the housing with sufficient pressure to set up a reliable contact, notably in the case of shocks.

Available types of cells suitable for use in timepieces and which provide voltages from about 1.3 to 1.6 Volts are not standardized and, in general, only the diameter is indicated with precision. The height and shpae of the cells are variable even between different series of a particular type of cell. Moreover, when the cell has been used for a certain time, the base frequently swells out. These variations make the securing of the cell by means of a cover plate relatively clumsy.

Additionally, the height of the cell generally determines the height of the movement because the part of the movement where the cell is more usually located is the thickest part thereof. Consequently, the use of a covering plate adds a further supplementary thickness which correspondingly increases the total thickness of the movement.

SUMMARY OF THE INVENTION

It is an object of the invention to overcome or avoid the aforementioned drawbacks by providing, in a timepiece comprising a frame part having a generally trough shaped housing for an electrical cell, and means for securing the cell in the housing, the improvement wherein said securing means comprise at least one member movable between a rest position at the periphery of the housing and an operative cell-securing position in which a cell-engaging part of the member protrudes laterally into said housing, actuating means for simultaneously (a) moving the member from the rest to the operative position and (b) moving the cell-engaging part of the member generally downwards into the housing, and means for holding said member in the operative position.

DESIGNATION OF THE DRAWINGS

FIG. 1 is a schematic plan view of a plate of a timepiece movement adapted to receive securing means according to the invention.

FIG. 2 is a cross section along line 2—2 of FIG. 1, with the securing means additionally shown.

FIG. 3 is a plan view of a washer forming a part of the securing means.

DESCRIPTION OF A PREFERRED EMBODIMENT

The plate schematically shown in plan in FIG. 1 comprises a trough shaped housing 2 for a cell 5 of corresponding substantially cylindrical shape, and two trunco-conical recesses 3 provided at the periphery of the housing 2 and intersecting therewith. Each recess 3 and 4 has a central threaded bore 15 and 16 respectively.

The cell 5 is somewhat thicker than the depth of the housing 2 so that it protrudes therefrom. The outer envelope or casing of the cell 5 forms the positive pole whilst the negative pole 6 is located on the face inserted into the housing 2 and rests on an elastic contact plate 7 connected to an electrical or electronic circuit (not shown). This contact plate 7 is separated from the bottom of the housing 2 by a layer 8 of electrically insulating material.

The means for securing the cell 5 in its housing 2 are formed, in this example, by two tempered steel trunco-conical washers 9 and 10 and two screws 11. Each washer has a cut-away face 13 forming a chord and making an acute angle wiht the smaller base of the washer. The trunco-conical part of the washers have the same inclination as the trunco-coincal wall of the recesses 3 and 4, so that the washers have the same overall shape and size as the recesses. However, the washers each have a central opening 14 with a diameter greater than that of the bores 15, 16 and the corresponding screws 11, 12.

The cell 5, whose outen diameter is slightly less than that of the housing 2 to facilitate insertion and removal thereof, is placed in the housing 2 with its positive pole 6 facing downwards. The screws 11 and 12 provided with washers 9 and 10 are then engaged in the threaded bores 15 and 16 of recesses 3 and 4. Each screw and washer is thus in the position shown at the left hadn side of FIG. 2. In this position, the sharp edge formed between the face 13 and the smaller base of the washer bears lightly against the lateral wall of the cell 5 which prevents the washer from freely falling into its recess.

By screwing in the screw, its head comes to bear against the washer and cause it to move down. Upon driving the washers fully into their recesses as shown at the right hand side of FIG. 2, the trunco-conical faces of the recesses 3 and 4 cause a lateral movement of the washers radially inwards towards the center of the housing 2. The sharp edges of the washers thus bite into the lateral wall of the cell 5 whose casing is of a softer material than the washers, for example non-tempered steel. This simultaneous descent of the washers and penetration of their sharp edges into the cell casing downwardly urges the cell and thus ensures a good contact of the negative pole 6 with the elastic contact plate 7.

The elasticity of this plate 7 also compensates for any possible loosening of the cell due to the plasticity and deformation of the cell casing.

It can be seen on FIG. 2 that the washer 10 screwed into the recess 4 by means of the screw 12 takes up less height than the cell 5.

DESCRIPTION OF FURTHER EMBODIMENTS

In a variant, not shown, the screws could themselves carry the means for securing the cell, For example, each screw can have a head with a cut-away chord, the remaining cylindrical edge of the screw head having a protruding helical edge intended to penetrate into the housing 2 and to thus bite into the lateral wall of the cell 5. By placing the cell in the housing 2 with the cut away edge of the screw head tangential to th wall of housing 2, turning the screw so that the upper part of the helical edge firstly engages with the lateral wall of the cell, and then screwing in the screw until the lower part of the helical edge engages with the cell, the cell 5 is urged downwardly into the housing 2.

Many other variants can be devised without departing from th scope or spirit of the appended claims. For example, more than two screws could be employed. The washers 9 and 10 could be replaced by split rings whose ends would be separated by screwing in a screw with a trunco-conical head so as to engage in the lateral wall of the cell 5.

It would also be possible to dispose an elastic element under the screw heads to ensure a good contact despite the plasticity or deformation of the cell casing.

What is claimed is:

1. In a timepiece comprising a frame part having a generally trough shaped housing for an electrical cell, and means for securing the cell in the housing, the improvement wherein said securing means comprise at least one member movable between a rest position at the periphery of the housing and an operative cell-securing position in which a cell-engaging part of the member protrudes laterally into said housing, said at least one member being of a relatively harder material than the casing of a cell for use in the timepiece, said cell-engaging part of the member being shaped to penetrate into the casing of a cell in the housing when the member is moved to the operative position, actuating means for simultaneously (a) moving the member from the rest to the operative position and (b) moving the cell-engaging part of the member generally downwards into the housing, and means for holding said member in the operative position.

2. A timepiece according to claim 1, in which said actuating means comprise at least one screw threadably engageable in a bore in said frame part adjacent to the periphery of said housing, a trunco-conical actuating surface engageable with said member being formed on one of said screw and the frame part adjacent said bore.

3. A timepiece according to claim 1, in which said member is formed by a washer having a large base, a small base, and a trunco-conical face, a section of the washer being cut away to form a chord-like cell-engaging edge making an acute angle with said small base, and a central hole through said washer ; said washer being housed, when in an operative position, in a recess in said frame part surrounding said bore and with said cell-engaging edge protruding into said housing ; said screw having a shank of lesser diameter than said hole in the washer and a head of greater diameter than said hole.

4. A timepiece according to claim 1, in which said actuating means comprise a screw threadably engageable in a bore in said frame part adjacent to the periphery of said housing, said screw having a generally cylindrical head comprising a cut-away section which cut-away section is flush with the wall of said housing in a given angular position of said screw when engaged in said bore, the cylindrical lateral surface on the non cut-away part of said head carrying an helical edge which protrudes laterally into said housing for other angular positions of said screw when engaged in said bore.

* * * * *